Aug. 16, 1927. 1,638,923
R. DANIELSON
CONCEALABLE RELEASABLY SECURED FISHHOOK AND BAIT
Filed Oct. 13, 1924
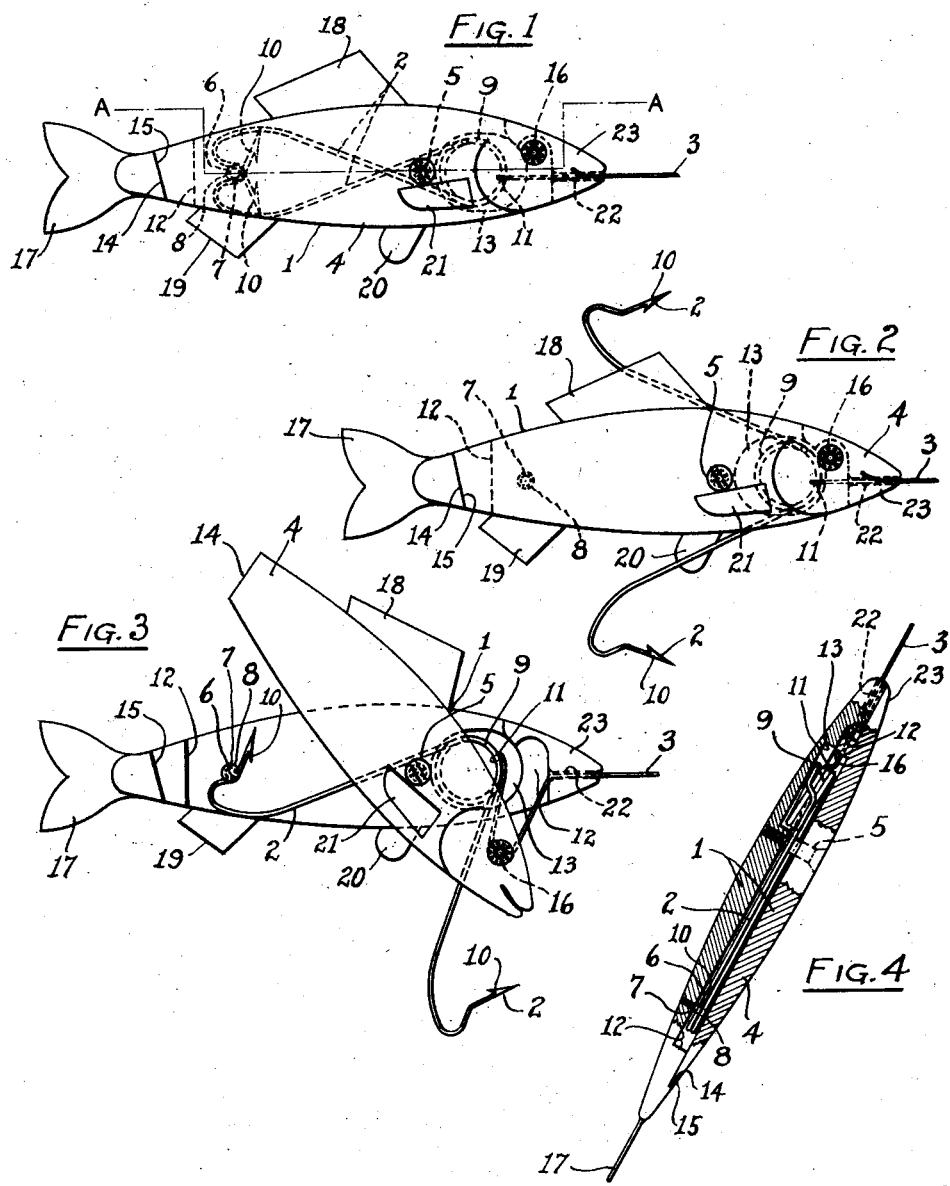
INVENTOR
Rubin Danielson
BY
Wm. G. Blomstran.
ATTORNEY.

Patented Aug. 16, 1927.

1,638,923

UNITED STATES PATENT OFFICE.

RUBIN DANIELSON, OF CHICAGO, ILLINOIS.

CONCEALABLE RELEASABLY-SECURED FISHHOOK AND BAIT.

Application filed October 13, 1924. Serial No. 743,338.

My invention relates particularly to improvements in combined fish-hooks and inanimate fish bait, wherein is contained the novel feature of concealing spring actuated fish-hooks within the body of the inanimate bait, and there secured until at such time as they are released by the hungry victim which grabs the supposed fish, or fish-like bait. One object of this novel feature of concealing the hooks, is to prevent them from being caught among the sea-weed and grass in the water while trolling, and, simultaneously, give the bait a life-like fish appearance. These, and other objects of my improvements will be disclosed in the accompanying drawings and more particularly described in the following specification and appended claim.

In the accompanying drawings the illustrations represent the improvements as contained in my invention.

Fig. 1, is a side view of the inanimate fish-bait and shows the fish-hooks, in dotted lines, concealed and secured within the body of the bait which contain my improvements.

Fig. 2, is also a side view of the inanimate fish-bait, but shows the spring actuated fish-hooks in their released or fish hooking position, which improvement is also embodied in my invention.

Fig. 3, is also a side view of the inanimate fish-bait, and shows how the fish-hooks are returned and held in their concealed position within the body of the bait, which contain my improvements, when a part of the side of the bait has been swung away to permit of the returning of the fish-hooks.

Fig. 4, is a horizontal transverse longitudinal section taken substantially on line A—A of Fig. 1.

Similar characters refer to similar parts throughout the several views.

In the several views, 1, represents the inanimate life-like fish-bait, and, 2, the fish-hooks, and, 3, the fish-line; and, 4, that part of the side of the fish-bait which is pivoted at, 5; it being so pivoted in order to permit it to be swung to the position shown in Figure 3, so that the hooks, 2, may be replaced to their closed, or secreted position as shown in Figures 1, and 4, and, also in Fig. 3, as at, 6, against the pin, 7, which has a flat head, 8, to prevent the hooks, 2, from slipping off when placing them against said pin, 7. The fish-hooks, 2, as will be seen, by referring to the several views, are formed from one piece of wire and looped, or coiled, to form a coil-spring, as at, 9, so that when the hook, or barbed ends, 10, are released from the pin, 7, which holds them in the closed, or secreted position, fly out in the position shown in Figure 2; that is, when the hungry victim grabs the supposed fish, or fish-like bait, causes the fish-line, 3, to become more taut, and which, being secured to the loop, 9, at, 11, in turn gives a sudden jerk on the hooks, 2, which become released from the pin, 7, and fly out and hook into the victim's mouth, whereby it is surely and securely caught.

By referring to the several views, particularly to that of Figure 3, and Figure 4, will be seen the cut-out, 12, and the recess, 13, where-in lies the fish-hooks, 2; the depression, or recess, 13, being elongated to permit of the longitudinal movement of the hooks, 2. On returning the hooks, 2, to their closed or secreted position, as shown in Figure 1, the side, 4, is also returned to its closed position with its end, 14, brought against the diagonal shoulder, 15, formed in the tail-end of the fish-like body, 1, as is clearly shown in Figures 1, 2, and 4. This shoulder, 15, prevents the side, 4, from swinging completely around on its axis, 5; while at the opposite end of side, 4, is a projection, or boss, 16, which is adapted to engage the line, 3, should it swing open while the inanimate fish-like bait is being drawn through the water. This feature of preventing the side, 4, from swinging open is very important; for, while the bait is being drawn through the water, the side, 4, should absolutely be maintained in its closed position so as to preclude any possible chance of anything becoming caught in the fish-hooks, which, may thereby, cause the fisherman to lose his bait. The fish-tail and the fins, 17, 18, 19, 20, and 21, respectively, are preferably made of red flannel cloth, while the body of the bait may be painted to resemble a real fish. By referring to Figure 3, it will be seen that the side, 4, has been swung open to permit of the hooks being returned and hooked in their closed position as indicated in Figures 1, 3, and 4, and also, that the line, 3, is caught around the boss, or lug, 16; and, when the hooks, 2, are properly placed and the side, 4, has been swung back to its closed position, and the line, 3, which passes around the boss, 16, and through the hole, 22, in the front end of the bait at 23, is drawn up taut, the fisherman is ready to proceed with his fishing and feel reasonably sure that he is not going to lose has bait by it being caught among the sea-weed, etc.

Having thus described my invention, the merits of my improvements can be readily understood, and it will be seen that the minor details of my construction may be altered in many ways without departing from the spirit of my invention, therefore, what I claim and desire to secure by Letters Patent is—

In a fish-bait, a life-like body consisting of two portions pivotally secured together intermediate their ends and having a mouth, compound spring actuated hooks within the body, a fish line passing through the mouth and attached to the hooks, said hooks are adapted to be held in concealed position within the body and are also adapted to be expanded out of the body into operative position when the bait is held against the pull of the line, said line is adapted to hold the pivotal portions of the body in a longitudinal alignment when the bait is drawn through water to conceal the hooks when they are in their unexpanded position within the body.

RUBIN DANIELSON.